UNITED STATES PATENT OFFICE 2,606,206

PERFLUOROSEBACIC ACID

Richard A. Guenthner, St. Paul, Minn., assignor to Minnesota Mining & Manufacturing Company, St. Paul, Minn., a corporation of Delaware No Drawing. Application February 5, 1951,
Serial No. 209,524

1 Claim. (Cl. 260—537)

This invention relates to my discovery of a new and useful dicarboxylic fluorocarbon acid, namely, perfluorosebacic acid (hexadecafluorosebacic acid), having the formula:

$$HOOCCF_2CF_2CF_2CF_2CF_2CF_2CF_2CF_2COOH$$

which can be abreviated as $(CF_2)_8(COOH)_2$.

While several lower dicarboxylic fluorocarbon acids have been previously reported, they were made by special methods and prior workers were unable to discover and characterize the present acid so far as I am aware (cf. U. S. Patents Nos. 2,426,224 — 2,438,484 — 2,438,485 — 2,453,146 — 2,453,147).

This new reactive fluorocarbon compound has particular value for making highly-fluorinated long-chain derivatives owing to the large number of carbon atoms in the fully fluorinated straight chain difunctional molecule. Nonflammable solid polymers containing over 50% by weight of combined fluorine can be made using this acid as the only source of fluorine.

I have discovered that it is possible to make this acid by electrochemically fluorinating the corresponding acid of the hydrocarbon system, sebacic acid, $(CH_2)_8(COOH)_2$.

Sebacic acid is dissolved in anhydrous liquid hydrogen fluoride and electrolyzed in a nickel-anode cell to accomplish fluorination, resulting in replacement by fluorine atoms of the sixteen carbon-bonded hydrogen atoms and the two hydroxyl groups of the acid molecule, yielding the acid difluoride, perfluorosebacyl difluoride, $(CF_2)_8(COF)_2$. There is simultaneously formed in the cell the monocarboxylic monofluoride, perfluoropelargonyl fluoride, $CF_3(CF_2)_7COF$, as the result of partial decarboxylation. Liquid fluorocarbons (carbon fluorides) are also formed as the result of complete decarboxylation and fragmentation. These fluorinated products are insoluble and settle to the bottom of the cell. This mixture is drained from the cell and is treated at ice-bath temperature with a small excess of water (causing rapid hydrolysis of the acid fluorides), yielding a mixture of perfluorosebacic acid, perfluoropelargonic acid, liquid fluorocarbons and a water phase. The acids are solids and are insoluble in the water and the fluorocarbons at temperatures near 0° C. and below. The acids are filtered from the mixture and dried. They can be separated from each other by use of a selective solvent procedure.

A satisfactory procedure is to heat the crude acid mixture in carbon tetrachloride, cool to crystallize out the acid mixture, filter out the latter, and extract with hot benzene to remove the perfluoropelargonic acid from the perfluorosebacic acid.

The equipment and procedures used in the electrochemical process have been described in the patent of J. H. Simons, No. 2,519,983 (August 22, 1950). Using a nickel-anode cell, I have employed a 4% solution of sebacic acid in anhydrous liquid hydrogen fluoride as the electrolyte solution, an applied cell voltage of approximately 5.5 to 6 volts (D. C.), and a cell temperature of about 20° C., in the making of the present acid. The fully fluorinated products of electrolysis are insoluble in the liquid hydrogen fluoride and settle to the bottom of the cell. The mixture is drained from the cell and processed as described above for recovery of the perfluorosebacic acid.

It might have been supposed that a recognizable yield of the perfluorosebacyl difluoride would not be obtained owing to the long length of the hydrocarbon chain in the starting acid, this chain being joined at each end to a carboxyl group; general carbon-carbon bond cleavage causing fragmentation and also eliminating one or both of the carboxyl groups from the molecules, leading only to a complex mixture of fluorocarbons and monocarboxylic acid fluorides. While such action does take place to some extent, resulting in the by-products noted above, I have discovered that a useful yield of the perfluorosebacyl difluoride is also obtained, which can be readily converted by hydrolysis to the perfluorosebacic acid end product and recovered in purified form.

This new acid, perfluorosebacic acid, $(CF_2)_8(COOH)_2$, is a white solid melting at 154–158° C. (the exact value depending upon the purity). The samples obtained were found to have a neutral equivalent value of 249, as compared to the calculated value of 245. The infrared absorption spectrum confirms the presence of carbon-fluorine bonds, carbonyl groups and hydroxyl bonds, and the absence of carbon-hydrogen bonds.

The acid is soluble in alcohol and ether; and it is insoluble in cold carbon tetrachloride and in benzene and other hydrocarbons. It is only slightly soluble in water at room temperature. The solubility at 25° C. is about 16 grams per liter of water. This acid has a striking effect on the surface tension of aqueous solutions, reducing the value at 25° C. from 72 dynes/cm. (pure water) to 21 dynes/cm., this minimum value being obtained at a concentration of 1.5 weight per cent. It is a much stronger acid than the non-fluorinated sebacic acid of the hydrocarbon system of organic compounds. Various derivatives can be made which are hydrolyzable to reform the acid, such as the anhydrides, acid halides, amides, nitriles, alkyl esters and salts.

Diethyl perfluorosebacate, $(CF_2)_8(COOC_2H_5)_2$, can be prepared by esterifying the acid with ethyl alcohol, using a toluene-alcohol-water azeotropic distillation procedure. It is a liquid boiling at about 156–159° C. at 27 mm. and has a density of 1.592 grams/c. c. at 25° C. and a refractive index of 1.341 at 25° C.

Perfluorosebacamide, $(CF_2)_8(CONH_2)_2$, can be prepared by reacting this ester with anhydrous ammonia in the presence of ether. This diamide is a white solid melting at about 233° C. (uncorrected).

The esters of the acid react with diamines to form polyamide types of polymers. The acid reacts with polyhydric alcohols to form polyester types of polymers.

Fluoro-alkyd synthetic resins can be made by reacting the acid with glycerine and with glycols. Thus in one experiment an equimolar mixture of the acid and ethylene glycol was placed in a flask fitted with a capillary for passing nitrogen through the reaction mixture to remove water as formed. The flask was heated by a bath maintained at about 125° C. for 22 hours, while passing a slow stream of dry oxygen-free nitrogen through the liquid mixture at atmospheric pressure. Then the pressure was reduced to 0.1 mm. and the temperature was gradually raised to 150° C. during a half hour period. Heating was continued under vacuum for 4½ hours. The product was a light-tan waxy solid having a melting point of 129–133° C. It contains 59% by weight of combined fluorine and is nonflammable, water-repellent, and insoluble in hydrocarbons and common organic solvents.

I claim:

As a new and useful reactive fluorocarbon compound, perfluorosebacic acid, having the formula $(CF_2)_8(COOH)_2$.

RICHARD A. GUENTHNER.

REFERENCES CITED

The following references are of record in the file of this patent:

UNITED STATES PATENTS

| Number | Name | Date |
| --- | --- | --- |
| 2,438,484 | Henne | Mar. 23, 1948 |
| 2,453,146 | McBee et al. | Nov. 9, 1948 |
| 2,502,478 | Padbury et al. | Apr. 4, 1950 |

OTHER REFERENCES

Gehring: Compt. rend. (Fr. Acad. Sci.), vol. 104, p. 1625 (1887).